United States Patent [19]

Josefsson et al.

[11] Patent Number: 5,475,958
[45] Date of Patent: Dec. 19, 1995

[54] OVEN MODULE WITH INTERMEDIATE EXPANSION JOINTS

[75] Inventors: Leif E. Josefsson, Sterling Heights; Robert D. Proctor, Troy; Peter Varga, Clarkston; Roger A. Thomas; Thomas E. Owens, both of Sterling Heights, all of Mich.

[73] Assignee: ABB Flakt, Inc., Troy, Mich.

[21] Appl. No.: 79,620

[22] Filed: Jun. 18, 1993

[51] Int. Cl.⁶ ............................ E04B 1/68; E04B 1/38
[52] U.S. Cl. .................... 52/396.01; 52/262; 52/265; 52/393; 52/506.04; 110/336
[58] Field of Search ..................... 52/506.02, 396.01, 52/506.03, 506.04, 393, 1, 262, 264, 265; 126/19 R, 151; 34/201; 432/238, 248, 252; 110/336

[56] References Cited

U.S. PATENT DOCUMENTS

| | | | |
|---|---|---|---|
| 1,486,528 | 3/1924 | Lawrence | 52/396.01 |
| 1,554,395 | 9/1925 | Young | 126/19 R |
| 1,771,145 | 7/1930 | Sadwith | 126/19 R |
| 2,209,816 | 7/1940 | Grapp . | |
| 4,198,951 | 4/1980 | Ellison et al. . | |
| 4,731,016 | 3/1988 | Dixon | 52/1 |
| 4,764,108 | 8/1988 | Carthew et al. | 432/251 |

OTHER PUBLICATIONS

AirRadiant™ Oven Brochure, p. 3 Haden Schweitzer Corporation, Feb. 1991.

Primary Examiner—Michael Safavi
Attorney, Agent, or Firm—Harness, Dickey & Pierce

[57] ABSTRACT

An oven module for use in industrial baking applications is disclosed having apparatus for accommodating the longitudinal thermal expansion in the interior walls of the oven module located intermediate the ends of the module. The oven module is easily assembled into an oven baking line because its ends are fixed and do not vary due to thermal expansion. Therefore, the present oven module alleviates numerous disadvantages in the shipping and assembly of an oven baking line which has been experienced with prior known oven modules. The floor, walls and roof of the oven module have both an interior and an exterior structure so that the interior surfaces of the oven module can be independently and rigidly supported. At opposite ends of the module, the interior and exterior structures for the floor, walls and roof are fixed to a common support member. Because the interior surfaces are fixed at opposite ends of the oven module, longitudinal thermal expansion therein is directed inward, toward thermal expansion joints which are located intermediate opposite ends of the module. Also included in the present invention is an improved explosion relief arrangement which contributes to the overall rigidity of the oven module while still meeting the requirements for explosion relief of the oven module.

7 Claims, 4 Drawing Sheets

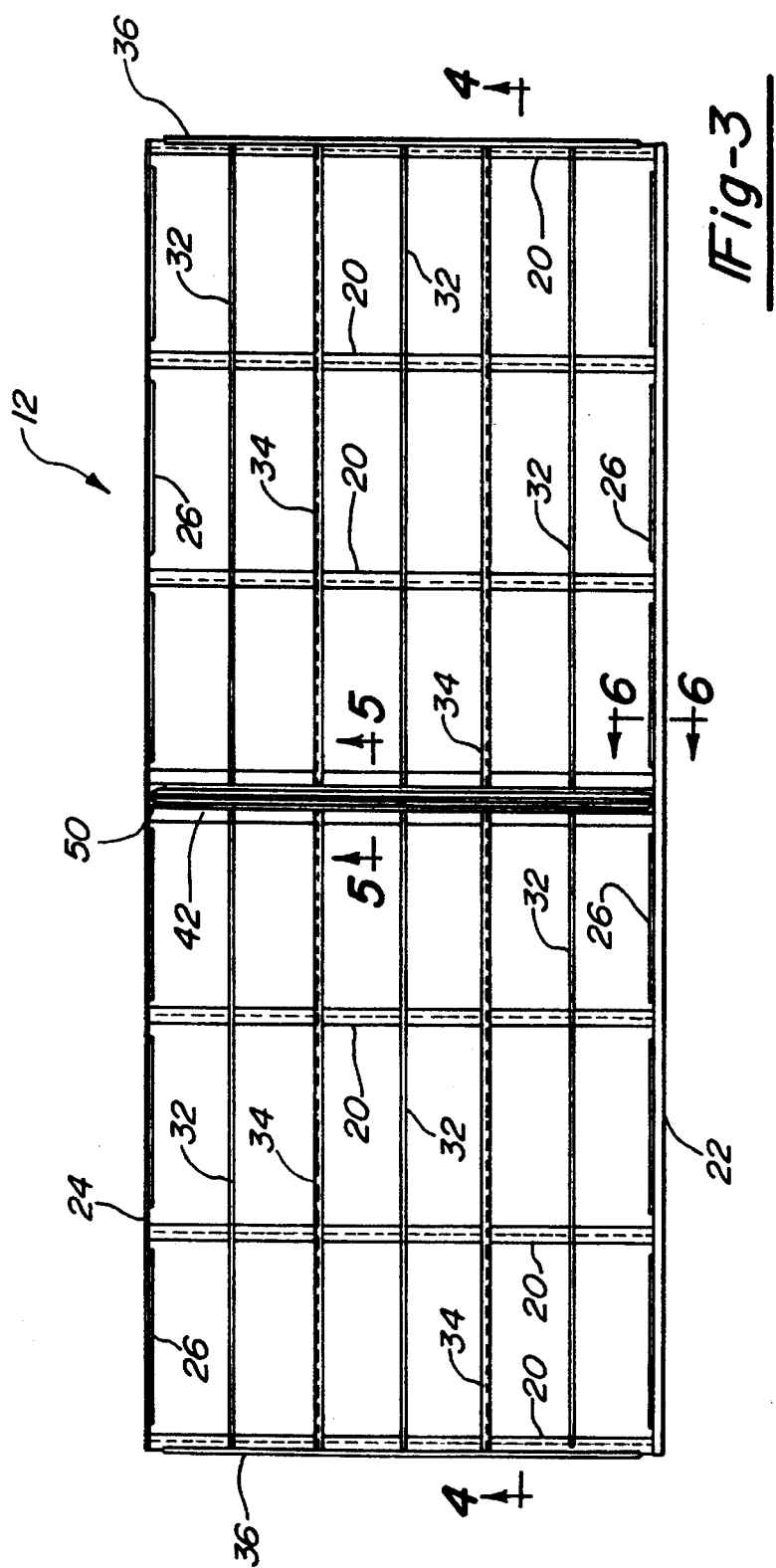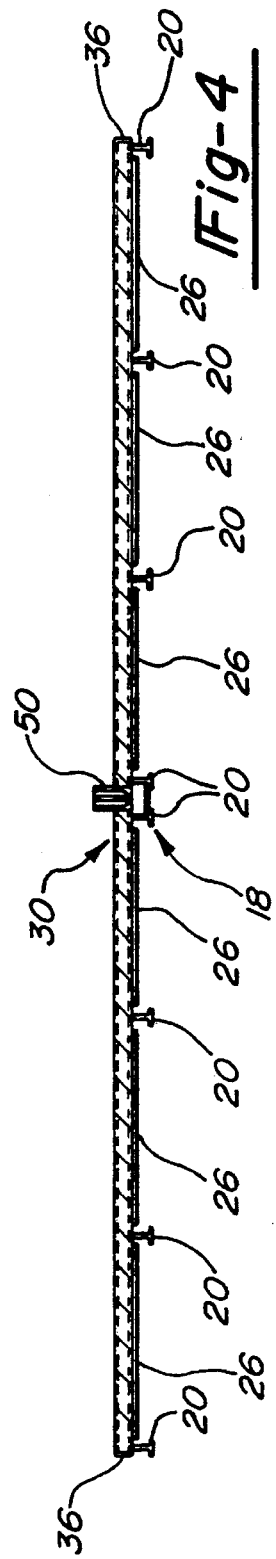

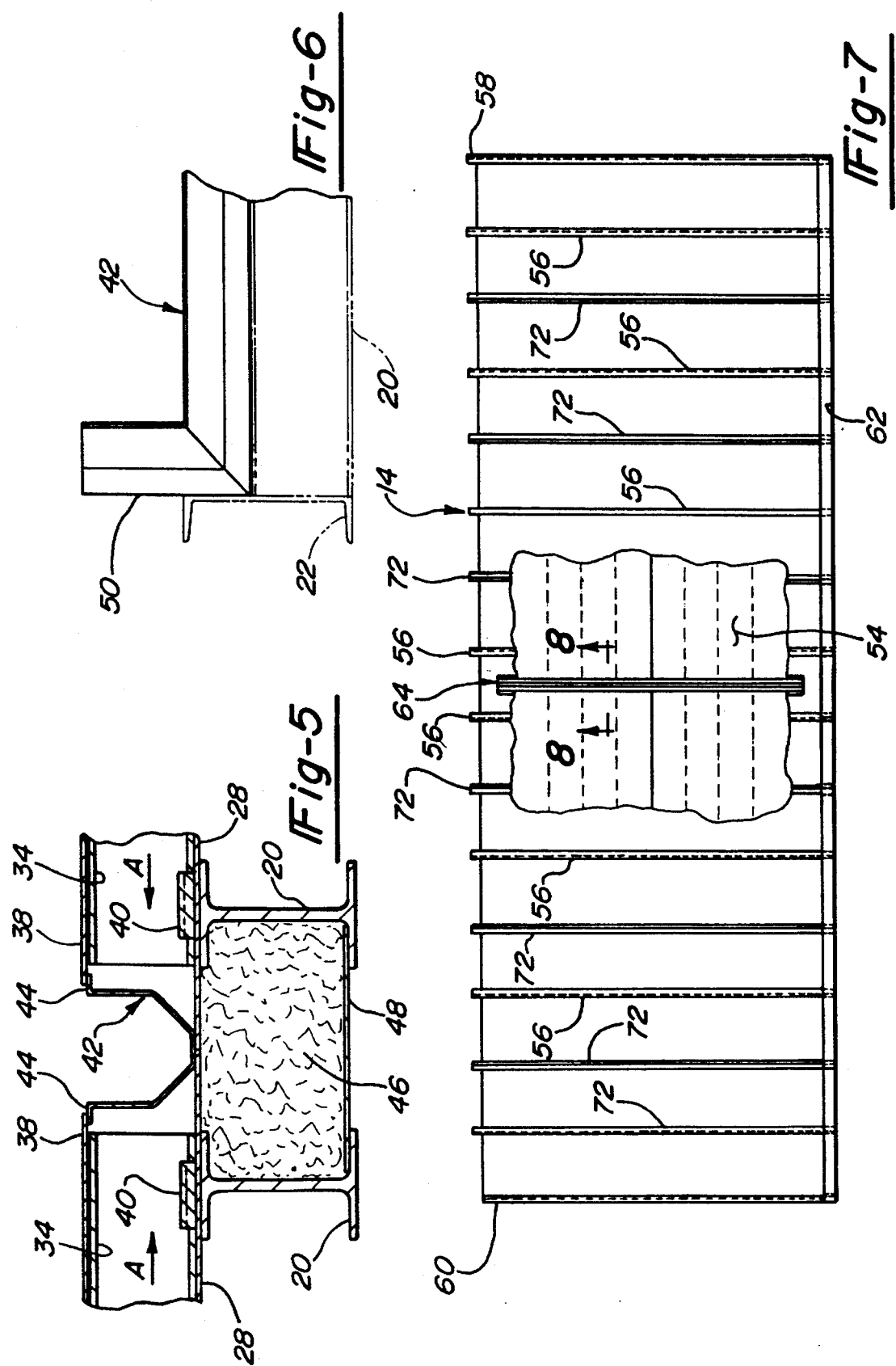

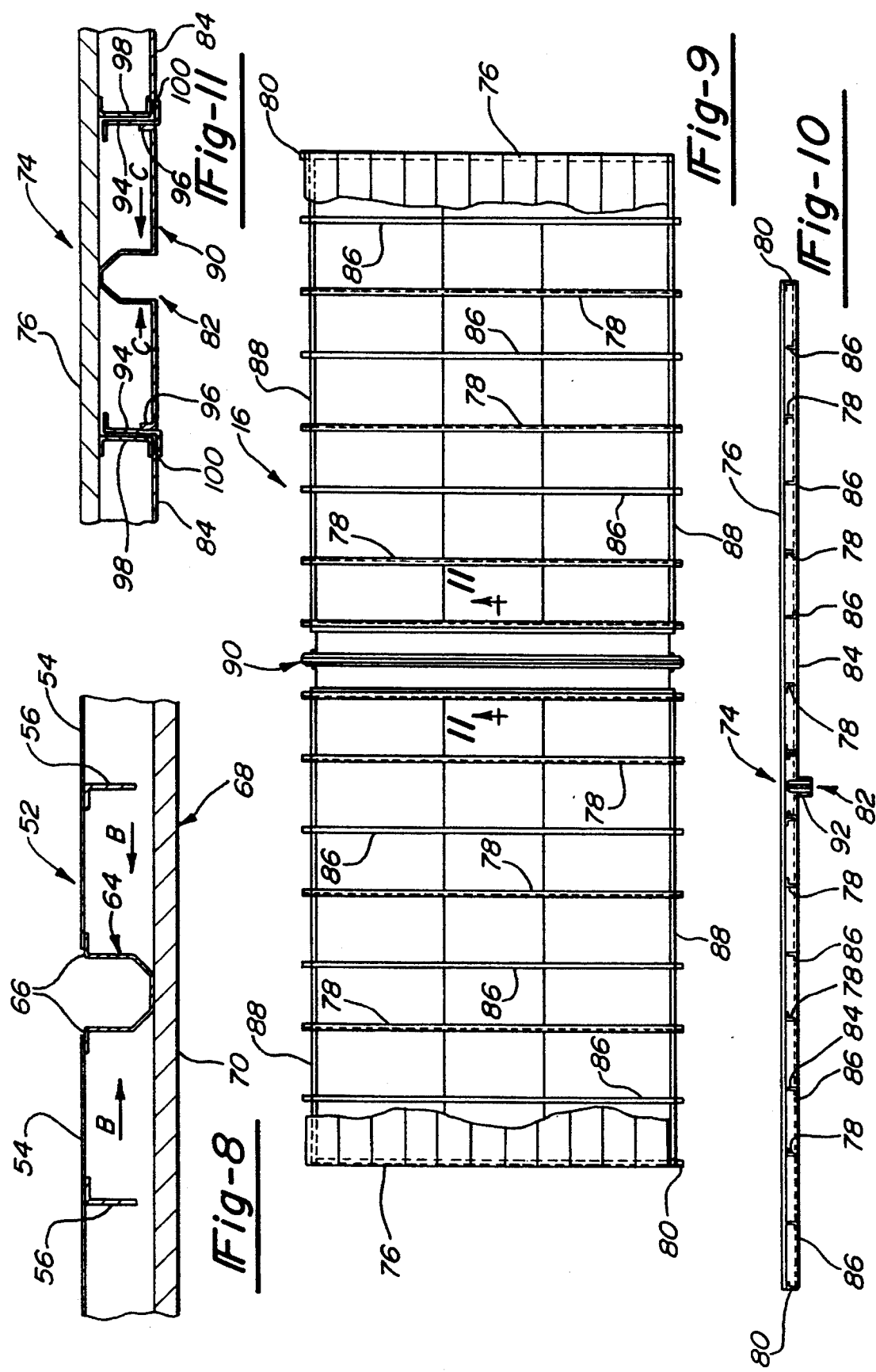

OVEN MODULE WITH INTERMEDIATE EXPANSION JOINTS

BACKGROUND OF THE INVENTION

1. Technical Field

The present invention relates generally to ovens for industrial baking applications and, more particularly, to a rigid oven module having expansion joints located intermediate to its ends for accommodating longitudinal thermal expansion in the module.

2. Discussion

For the past 10 to 15 years, modular baking ovens have been employed in numerous manufacturing environments for a variety of industrial baking applications, such as the baking of paint or another coating that is applied to any of an assortment of manufactured articles, including automobile bodies and components. Modular ovens are generally manufactured in sections or modules which are subsequently shipped to the place of use. The individual oven modules are then connected, in series, to form an oven baking line. Individual oven modules may be between 20 and 40 feet long and their layout may be varied depending upon the available floor space at the location of use. For example, a single pass oven baking line may include as many as 14 or more modules and extend to upwards of 500 feet or more. Whereas the same number of modules may be employed in a double pass oven baking line extending only, for example, 250 feet.

Typically, modular ovens include fabricated metal thermal expansion joints which are used to accommodate the longitudinal thermal expansion that occurs in the interior wall surfaces of the oven modules during their operation. These expansion joints are generally located at the ends of each oven module and are installed during the final assembly of the individual oven modules into the oven baking line. These expansion joints are also intended to create a seal at the ends of adjoining oven modules after they have been assembled in series, to prevent the escape of any gases from within the oven during operation. However, there have been several difficulties associated with this type of expansion joint. For example, because the thermal expansion joints are located at the ends of each individual oven module, both ends of the module are free to move when subjected to the forces of thermal expansion. Such movement can often result in significant overall dislocation of the oven modules along the entire baking line. Further, structural damage to the thermal expansion joint, which has been known to occur during the shipment and assembly of the oven modules, often cannot be corrected during the connection of adjoining oven modules and, consequently, the installation of the thermal expansion joints may often be difficult and unpredictable. Also, damaged thermal expansion joints can cause leaks of gases from the oven module during operation, thereby resulting in an undesirable environmental hazard. Still another undesirable design feature of the conventional oven modules described above is that the interior walls of these modules, which experience the greatest amount of the thermal expansion, serve to structurally support the module. Consequently, rebracing of the oven module is often required after periods of use.

Previous efforts to alleviate the above conditions have included attempts to design and construct a modular oven that includes thermal expansion joints located at or near the middle of the oven module as opposed to at its ends. However, these attempts have not proved successful and have resulted in modular ovens with unacceptably flimsy structures that were very susceptible to damage during shipping and assembly and which were difficult to install on site.

Explosion relief is another feature typical of oven modules. Conventional oven modules have included explosion relief simply by incorporating a gravity seal between the roof section and walls of the module. That is, the roof section of the module simply rests upon the walls, and by its own weight effectuates a seal at the edges where it meets the walls of the module which may be "blown" in the event of an explosion in the oven module. In this configuration, however, the roof does not contribute to the structural rigidity of the oven module.

In view of the above, it has been considered desirable to provide an oven module for industrial baking applications that is capable of accommodating the longitudinal thermal expansion that is experienced in the oven module, yet is easy to ship and assemble and also exhibits increased structural rigidity over prior known oven modules.

SUMMARY OF THE INVENTION

Accordingly, the present invention teaches an oven module for use in industrial baking applications which alleviates numerous disadvantages associated with the performance, shipping and assembly of an oven baking line experienced with prior known oven modules. The oven module disclosed herein includes apparatus for accommodating the longitudinal thermal expansion experienced in the interior surface of the module that is located intermediate opposite ends of the module. The oven module generally includes a floor, a plurality of walls and a roof each of which have both an interior and an exterior structure. Thereby, interior surfaces of the oven module are independently and rigidly supported. At opposite ends of the module, the interior and exterior structures for the floor, walls and roof are fixed to a common support member. Thermal expansion joints are provided intermediate opposite ends of the oven module to accommodate longitudinal thermal expansion in the interior surfaces. Because the interior surfaces are fixed at opposite ends of the oven module, their longitudinal thermal expansion is directed inward, toward thermal expansion joints. Also included in the present invention is an improved explosion relief arrangement which contributes to the overall rigidity of the oven module while still meeting the requirements for explosion relief of the oven module.

BRIEF DESCRIPTION OF THE DRAWINGS

The various advantages of the present invention will become apparent to one skilled in the art upon reading the following specification, in which:

FIG. 3 is a plan view of the floor section sub-assembly for the oven module of FIG. 1;

FIG. 4 is a cross-sectional view taken along line 4—4 of FIG. 3 showing an elevational view of the floor section sub-assembly of FIG. 3;

FIG. 5 is a cross-sectional detail view taken along line 5—5 of FIG. 3 showing the thermal expansion joint for the floor section sub-assembly of FIG. 3;

FIG. 6 is a detail view taken along line 6—6 of FIG. 3 showing the vertical extension portion of the thermal expansion joint;

FIG. 7 is a front view of the wall section sub-assembly for the oven module of FIG. 1;

FIG. 8 is a cross-sectional detail view taken along line 8—8 of FIG. 7 showing the thermal expansion joint for the wall section sub-assembly of FIG. 7;

FIG. 9 is a plan view of the roof section sub-assembly for the oven module of FIG. 1;

FIG. 10 is an elevational view of the roof section sub-assembly of FIG. 9; and

FIG. 11 is a cross-sectional detail view taken along line 11—11 of FIG. 9 showing the thermal expansion joint for the roof section sub-assembly.

DESCRIPTION OF A PREFERRED EMBODIMENT

It should be understood from the outset that while the following discussion illustrates a particular embodiment of the present invention, this is for the purpose of example only, and other modifications may be made to the particular embodiment without departing from the spirit and scope of the invention.

Figure 1:
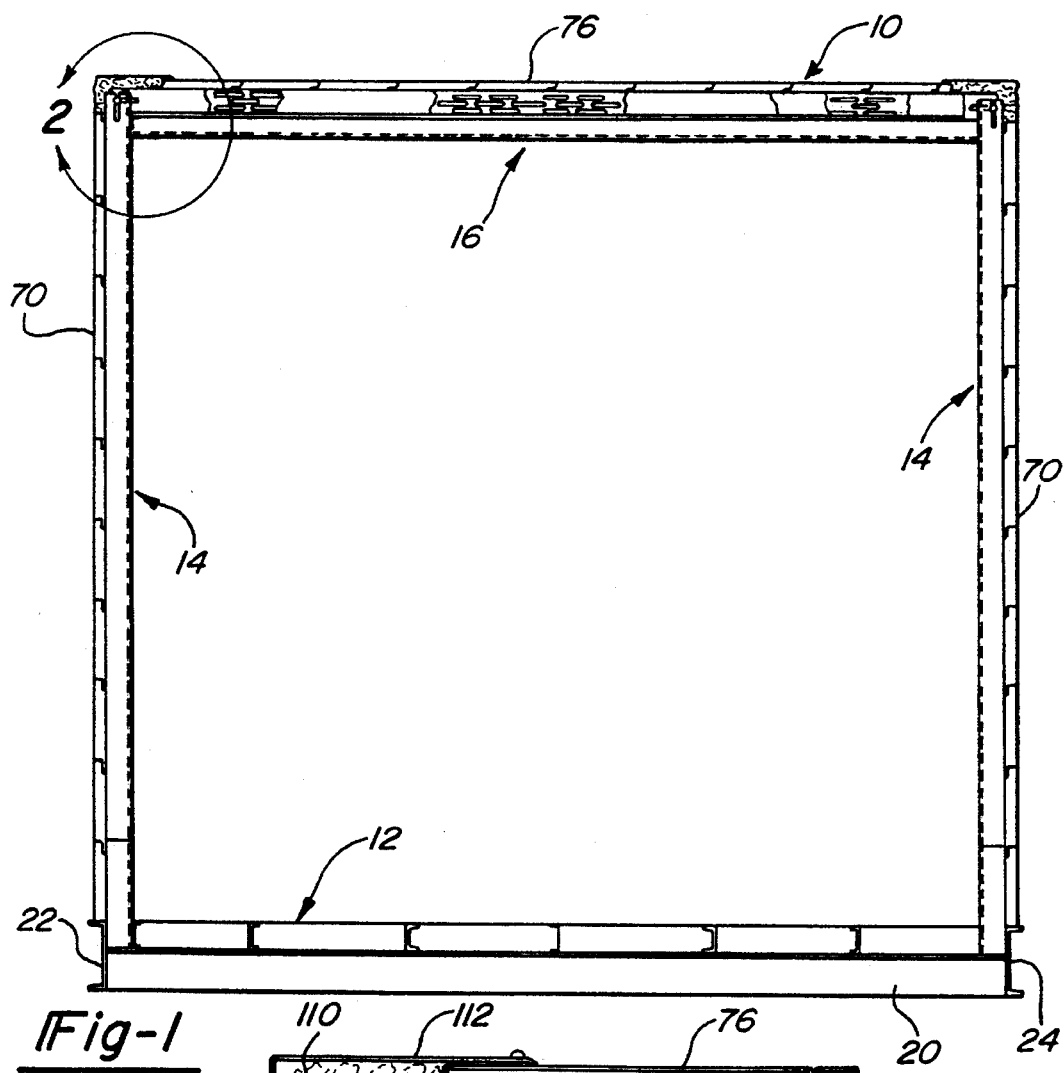
FIG. 1 is a cross-sectional front view of an assembled oven module arranged according to the principles of the present invention.

With reference to the drawings, FIG. 1 illustrates a cross-sectional front view of an oven module 10 constructed in accordance with the principles of the present invention. The construction of oven module 10 is best understood upon consideration of its separate sub-assemblies, namely the floor section sub-assembly 12, the wall section sub-assemblies 14 and the roof section sub-assembly 16.

Turning now to FIGS. 3, 4, 5 and 6, the floor section sub-assembly 12 of the oven module 10 of the present invention is shown. Specifically, in FIG. 3 the structural framework of the floor section sub-assembly 12 as seen from the interior of the oven module 10 is illustrated. Beginning with the exterior floor structure 18, rigid support is provided by a plurality of lateral support members 20 that are laterally spaced along the length of the floor section 12 and are suitably fixed, such as by welding, to longitudinal support members 22 and 24. Support brackets 26 are mounted on longitudinal support members 22 and 24 in between lateral support members 20 as shown. An exterior floor surface 28, best seen in FIG. 5, is positioned on top of lateral support members 20 and in between longitudinal support members 22 and 24 and secured in place.

Interior floor structure 30 includes a plurality of longitudinal support members 32 and 34 which are fixed at opposite ends to lateral support members 36. Lateral support members 36 are, in turn, attached to exterior floor structure 18 lateral support members 20. Longitudinal support members 34 are intended to provide greater structural support than longitudinal members 32, and can be utilized to carry the load of a conveyor (not shown) or the like. Longitudinal support members 32 and 34 each extend from their opposite fixed ends toward the center of tile floor section sub-assembly 12, but do not extend the entire length of the floor section 12. An interior floor surface 38, shown in FIG. 5, rests on top of longitudinal support members 32 and 34. Also illustrated in FIG. 5 are longitudinal support members 34 that are placed on exterior floor surface 28 which, in turn, is supported by lateral support members 20. Guide rails 40 are fixed to the exterior floor structure 18 at lateral support members 20 and surround structural longitudinal support members 34. Guide rails 40 contain longitudinal support members 34 laterally in the floor section 12, but do not prevent longitudinal support members 34 from longitudinally expanding due to thermal forces. Insulation (not shown) is packed in the space between interior floor structure 30 and exterior floor structure 18 to provide a thermal barrier therebetween. In addition, the fiber board insulation acts to inhibit lateral movement of longitudinal support members 32.

As is best seen in FIGS. 3 and 5, thermal expansion joint 42 is positioned intermediate the ends of opposing longitudinal support members 32 and 34. Interior floor surface 38, which rests upon longitudinal support members 32 and 34 is fixed to thermal expansion joint 42 at flanges 44, such as by welding. Also shown in FIG. 5, insulation 46 is packed beneath exterior floor surface 28 and plate 48, which extends between two lateral support members 20.

With reference to FIGS. 3, 4 and 6, thermal expansion joint 42 extends across the entire width of floor section sub-assembly 12. Also, vertical extension portions 50, which extend in a direction perpendicular to the plane of floor section 12, are incorporated in thermal expansion joint 42 as shown. As will be described in greater detail, vertical extension portions 50 are included to facilitate a connection with wall section sub-assemblies 14 thermal expansion joints 64.

As already described, interior floor structure 30 and exterior floor structure 18 are fixed together at opposite longitudinal ends of the floor section sub-assembly 12, specifically where interior floor structure 30 lateral support members 36 are attached to exterior floor structure 18 lateral members 20. Consequently, any longitudinal thermal expansion of either the interior floor structure 30 longitudinal support members 32 and 34 or interior floor surface 38 is guided in an inward direction toward the center of the floor section sub-assembly 12. Also, it should be appreciated that the construction described above enables the floor section sub-assembly 12 to maintain its rigidity despite the inclusion of thermal expansion joint 42 intermediate the ends of the floor section 12.

Turning now to FIGS. 7 and 8, a wall section sub-assembly 14 is shown. FIG. 7 illustrates wall section sub-assembly 14 as it is viewed from the inside of the oven module 10. Interior wall structure 52 includes interior wall surface 54 which is supported by a plurality of vertical support members 56 that are secured to interior wall surface 54. At opposite ends, interior wall surface 54 is connected to vertical support members 58 and 60, which are, in turn, fixed to longitudinal support member 62. As shown in greater detail in FIG. 8, thermal expansion joint 64 is fixed to interior wall surface 54 at flanges 66 in a similar fashion as already described with respect to floor section sub-assembly 12 thermal expansion joint 42. Thermal expansion joint 64 extends substantially the entire vertical distance (i.e. height) of the wall section sub-assembly 14.

With reference again to FIG. 8, vertical support members 56 for interior wall surface 54 are fixed only to interior wall surface 54 and do not inhibit interior wall surface 54 from expanding inward from opposite ends of oven module 10 toward thermal expansion joint 64.

Exterior wall structure 68 includes exterior wall surface or decking 70. Decking 70 is comprised of longitudinally extending plank-like members which can be adjacently interlocked by male and female connection portions 71 and 73, respectively, as shown in greater detail in FIGS. 1 and 2. Decking 70 is also supported by a plurality of vertical support members 72. As shown in FIG. 7, vertical support members 72 supporting decking 70 are alternatingly dispersed between vertical support members 56 supporting interior wall structure 52. Decking 70 is also fixed to vertical support members 58 and 60. Insulation (not shown) is packed in the space between interior wall structure 52 and exterior wall structure 68. Because the interior wall structure 52 and the exterior wall structure 68 are fixed at opposite ends of the wall section sub-assembly 14 (i.e. both the interior wall structure 52 and the exterior wall structure 68 are connected to vertical support members 58 and 60), again it should be appreciated that the construction described enables the wall section sub-assembly 14 to maintain its rigidity despite the inclusion of thermal expansion joint 64 intermediate the ends of the wall section 14.

Turning the attention now to FIGS. 9, 10 and 11, the roof section sub-assembly 16 of the oven module 10 is shown. FIG. 9 depicts the roof section sub-assembly 16 as it is viewed from the outside of the oven module 10. Exterior roof structure 74 includes exterior roof surface or decking 76 which is identical to exterior wall surface decking 70. Decking 76 is supported by a plurality of lateral support members 78 and is fixed to lateral support members 80 at opposite ends of roof section 16.

Interior roof structure 82 includes interior roof surface 84 which is supported by a plurality of lateral support members 86. As described earlier with respect to the vertical support members 56 and 72 of wall section sub-assembly 14 and as shown in FIG. 10, lateral support members 86 and 78 for each of the interior and exterior roof surfaces 84 and 76, respectively, are positioned alternatingly within the roof section sub-assembly 16. Additional support for the interior roof structure 82 is provided by longitudinal support members 88. Longitudinal support members 88 are attached to the interior roof surface 84 in between lateral support members 86. Interior roof surface 84 is also fixed at opposite ends by lateral support members 80. Insulation is again packed in the space between the interior and exterior roof structures 82 and 74.

As shown in FIGS. 9 and 10 and in a similar manner as that described with respect to the floor section sub-assembly 12, thermal expansion joint 90 extends laterally across the width of the roof section 16 and includes vertical extension portions 92 which extend in a downward direction, perpendicular to the plane of the roof section 16. As described earlier in connection with vertical extension portions 50, vertical extension portions 92 are included to facilitate a connection with wall section sub-assemblies 14 thermal expansion joints 64. FIG. 11 shows, in detail, the thermal expansion joint 90 for the roof section sub-assembly 16. Expansion joint 90 is fixed to "Z" brackets 94 at flanges 96. Interior roof surface 84, which extends inwardly from opposite ends of roof section 16, terminates at channels 98. A gasket 100 is included between "Z" brackets 94 and channels 98 and provides a seal therebetween. Thermal expansion joint 90 is not fixed to either exterior roof surface 76 or channels 98 of roof section sub-assembly 16. Instead, upon assembly of the roof section sub-assembly 16 into the oven module 10, thermal expansion joint 90 is connected at vertical extension portions 92 to corresponding thermal expansion joints 64 in wall section sub-assemblies 14. Once thermal expansion joint 90 is attached to thermal expansion joints 64, the remaining portion of the roof section sub-assembly 16 is placed over thermal expansion joint 90.

As is the case with the floor section and wall section sub-assemblies 12 and 14, the construction of the roof section sub-assembly 16 directs thermal expansion of the interior roof surface 84 inward from opposite ends of the roof section 16, yet enables the roof section 16 to maintain its rigidity.

Suitable materials for the fabrication of the various components described in connection with the floor, wall and roof section sub-assemblies 12, 14 and 16 of the present invention are well-known in the art. For example, it is contemplated that many of the support member components described above, the interior wall surfaces, as well as the thermal expansion joints can be made from a #14 to #18 gauge aluminized steel material. Other components which require greater strength, such as the support structure components for the floor section sub-assembly 12 can be manufactured from A36 steel. A material such as #18 gauge utility decking can form the exterior surfaces of the wall sections 14 and roof section 16. Insulation can be a fiber board insulation such as that which is commercially available. In addition, welding is presently contemplated as the preferred method for joining, fixing or connecting the steel components of the oven module 10.

Figure 2:
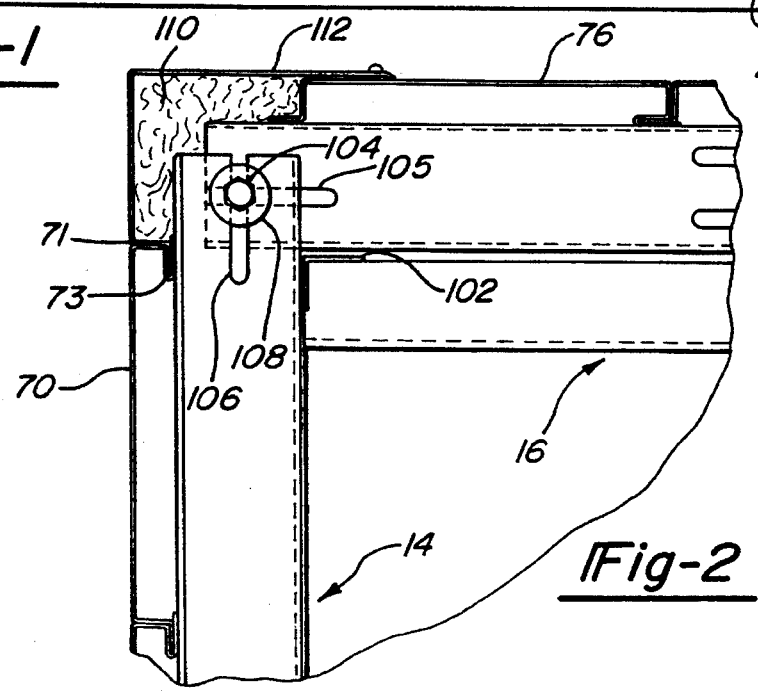
FIG. 2 is a detail view of a portion of FIG. 1 showing explosion relief apparatus arranged according to the principles of the present invention.

Looking again at FIGS. 1 and 2, a cross-section of an assembled oven module 10 is illustrated. Floor section 12, wall sections 14 and roof section 16 sub-assemblies are intended to be finally assembled into an oven module 10, prior to shipping the oven module 10 to the site of installation. Wall section sub-assemblies 14 are positioned on floor section 12 as shown in FIG. 1, such that the wall section sub-assemblies 14 are supported by the structural framework 20, 22 and 24 of the floor section sub-assembly 12. As discussed earlier with respect to the roof section 16, floor section sub-assembly 12 thermal expansion joint 42 is sealably connected to wall section sub-assemblies 14 thermal expansion joints 64 at vertical extension portions 50. Thermal expansion joint 90 for roof section 16 is then connected as previously described. Thus, when finally assembled, the oven module 10 has a single continuous thermal expansion joint for accommodating thermal expansion in all of the interior surfaces of the oven module 10.

Roof section 16, which contributes to the structural rigidity of the oven module 10, is assembled to wall sections 14 and provides for explosion relief. Assembly of roof section 16 to wall sections 14 is shown in greater detail at FIG. 2. A gasket 102 is included between wall and roof sections 14 and 16 to achieve a seal and prevent the escape of gases during the operation of the oven module 10. Explosion relief is accomplished by explosion relief fasteners 104 which are secured at the intersections of wall section 14 vertical support members 56, 72, 58 and 60 and roof section 16 lateral support members 80, 98, 78 and 86. As described earlier, vertical support members 56 of the interior wall structure 52 and the vertical support members 72 of the exterior wall structure 68 are alternatingly disposed in the wall section 14. Likewise the lateral support members 86 of interior roof structure 82 and the lateral support members 78 of the exterior roof structure 74 are disposed in alternating fashion. At assembly of the roof section 16, interior wall structure 52 vertical support members 56 are fastened to interior roof structure 82 lateral support members 86 and exterior wall structure 68 vertical support members 72 are fastened to exterior roof structure 74 lateral support members 78. In this manner, thermal expansion of interior wall surface 54 and interior roof surface 84 is not inhibited because their respective vertical and lateral support members 56 and 86 are free to move or "float" as the surfaces 54 and 84 expand.

As shown in FIG. 2, explosion relief fasteners 104 are placed through slots 105 of roof section 16 lateral support members 78, 86, and 80 but rest in slots 106 of wall section 14 vertical support members 56, 72, 58 and 60. Slots 106 are open in a vertical direction at the top of wall sections 14. In this manner, the vertical travel of explosion relief fasteners 104 is not structurally prohibited. Explosion relief fasteners 104 may be standard SAE grade threaded fasteners. Washers 108 are included between fasteners and support members and are formed from a structurally sound, non-corrosive, heat resistant and slippery material. A material such as teflon is considered suitable for washers 108. Insulation 110 and flashing 112 act to insulate and cover exterior corners at wall and roof sections 14 and 16.

It should be understood that upon completion of the assembly of several individual oven modules 10, the oven modules 10 may be connected in series to form an oven baking line suitable for operation in a manufacturing environment. It should also be appreciated that because the oven modules 10 incorporate the thermal expansion joints 42, 64 and 90 intermediate the ends of the module 10, the ends of the modules 10 are fixed and thereby make the connection of several modules 10 in series a much simpler task than with conventional oven modules.

In operation, the interior of the oven module 10 is subjected to elevated temperatures which causes thermal expansion to occur in the interior surfaces 38, 54 and 84 of the oven module 10. As described above, in the oven module 10 of the present invention, the thermal expansion of these surfaces 38, 54 and 84 is directed inward from the opposite fixed ends of the module 10 toward the thermal expansion joints 42, 64 and 90. As thermal expansion is experienced in the interior floor and wall surfaces 38 and 54 of the module 10, thermal expansion joints 42 and 64, which are connected to floor and wall surfaces 38 and 54 at flanges 44 and 66, respectively, are caused to compress or flex inwardly, as shown by arrow A in FIG. 5 and arrow B in FIG. 8, to accommodate the expansion. As interior roof surface 84 thermally expands, channels 98 are forced inwardly against "Z" brackets 94, which in turn cause thermal expansion joint 90 to flex inwardly as shown by arrow C in FIG. 11 to accommodate the expansion.

Although the location of the thermal expansion joints 42, 64 and 90 has been described and illustrated as being at or near the center of the oven module 10, it should be understood and appreciated that the thermal expansion joints 42, 64 and 90 may be located at any position intermediate the ends of the oven module 10 to achieve the numerous advantages of the present invention.

Various other features and modifications will become apparent to one skilled in the art after having the benefit of studying the teachings of the specification, the drawings, and the following claims.

What is claimed is:

1. An oven module of the type for use in industrial baking applications and having a longitudinal axis along which objects to be baked are passed, said oven module comprising:

a rigid floor section having an interior floor structure and an exterior floor structure which are attached at opposite longitudinal ends of said floor, the exterior floor structure including a plurality of first lateral support members spaced along the length of the floor section and connected to a plurality of first longitudinal support members and an exterior floor surface positioned upon the first lateral support members, the interior floor structure including an interior floor surface, a plurality of second longitudinal support members spaced along the width of the floor section and connected to a plurality of second lateral support members at opposite ends of the floor section and first means for accommodating thermal expansion in the interior floor surface, the first means for accommodating thermal expansion located intermediate opposite longitudinal ends of the floor section;

a rigid roof section, having an interior roof structure and an exterior roof structure which are attached at opposite longitudinal ends of the roof section, the exterior roof structure including an exterior roof surface, a plurality of third lateral support members spaced along the length of the roof section and connected to the exterior roof surface, and a plurality of fourth lateral support members located at opposite ends of the roof section and connected to the exterior roof surface, the interior roof structure including an interior roof surface, a plurality of fifth lateral support members spaced along the length of the roof section and connected to the interior roof surface, the fifth lateral support members being interspersed between the third lateral support members, and second means for accommodating thermal expansion in the interior roof surface the second means for accommodating thermal expansion being located intermediate opposite longitudinal ends of the roof section; and at least two ridged wall sections each having an interior wall structure and an exterior wall structure which are attached at opposite longitudinal ends of the wall section, each interior wall structure including an interior wall surface, a plurality of first vertical support members spaced along the length of the wall section and connected to the interior wall surface and a plurality of second vertical support members connected to both the interior wall surface end to a third longitudinal support member, each interior wall structure including third means for accommodating thermal expansion in the interior wall surface, the third means for accommodating thermal expansion being located intermediate opposite longitudinal ends of each wall section, and each exterior wall structure including an exterior wall surface, a plurality of third vertical support members being interspersed between the first vertical support members, the exterior wall surface also being connected to the second vertical support members.

2. The oven module of claim 1, further comprising means for allowing explosion relief between each said wall and said roof.

3. The oven module of claim 2, wherein said means for allowing explosion relief comprises fastening means for connecting said interior roof structure with said interior wall structures and said exterior roof structure with said exterior wall structures.

4. The oven module of claim 3, wherein said fastening means is a SAE grade threaded fastener having washers made from a non-corrosive, heat resistant material.

5. The oven module of claim 4, wherein said washers are made from teflon.

6. An oven module of the type for use in industrial baking applications and having a longitudinal axis along which objects to be baked are passed, said oven module comprising:

a floor having an interior floor structure and an exterior floor structure which are rigidly attached at opposite longitudinal ends of said floor, the interior floor structure including a first thermal expansion joint located intermediate the opposite longitudinal ends of the floor and extending the entire width of the floor and having vertical extension portions located at its opposite ends which extend in an upward direction toward an interior of the oven module;

a roof having an interior roof structure and an exterior roof structure which are rigidly attached at opposite longitudinal ends of the roof, the interior roof structure including a second thermal expansion joint located intermediate the opposite longitudinal ends of the roof and extending the entire width of the roof and having vertical extension portions located at its opposite ends which extend in a downward direction toward the interior of the oven module;

a plurality of walls extending between the floor and the roof and each having an interior wall structure and an exterior wall structure which are rigidly attached at opposite longitudinal ends of the wall, each interior wall structure including a third thermal expansion joint joined to the first and second thermal expansion joints to form a continuous connection therebetween; and means for allowing explosion relief of the oven module comprising SAE grade threaded fasteners having washers made from a non-corrosive, heat resistant material for connecting the interior roof structure with the interior wall structures and the exterior roof structure with the exterior wall structures.

7. The oven module of claim 6, wherein said washers are made from teflon.

\* \* \* \* \*